United States Patent Office 2,856,359
Patented Oct. 14, 1958

2,856,359

SUPERBASIC ALKALINE EARTH METAL SULFONATES

Raymond C. Schlicht, Wappingers Falls, N. Y., assignor to The Texas Company, New York, N. Y., a corporation of Delaware No Drawing. Application July 20, 1956
Serial No. 598,986

7 Claims. (Cl. 252—33)

This invention relates to improved oil soluble superbasic alkaline earth metal sulfonates and method of preparing same.

Oil soluble superbasic sulfonates contain higher quantities of alkaline earth metal than is present in the corresponding normal sulfonate salts. Therefore they are in demand where high concentrations of alkaline earth metal are desired in oleaginous vehicles such as in lubricant compositions. The key to forming such superbasic material is the use of a promoter in the reaction mixture as is exemplified by a number of prior U. S. patents, for example: 2,616,911 and 2,616,924. The promoted products shown in these patents are characteristic superbasic sulfonates.

At the present time superbasic sulfonates are broadly characterized as complexes, and the precise molecular structure of these products is not generally known. It has been postulated that these high metal content complexes are actually colloidal suspensions or dispersions of metal compounds peptized by the normal salt of the sulfonic acid in such complex.

Heretofore, the most common promoter used has been an alkylated phenol such as nonyl phenol. Other classic promoters disclosed for formation of the superbasic sulfonates have been lower molecular weight aromatic carboxylic acids, lower molecular weight sulfonic acids, cresols, xylenols, catechol, beta-naphthol, and a host of other compounds all of which can be typified as being acidic in character.

In a typical preparation of superbasic sulfonates one mixes an oil-soluble hydrocarbyl sulfonic acid and/or normal alkaline earth metal salt thereof, a basically-reacting alkaline earth metal compound such as the hydroxide, oxide, carbonate, bicarbonate, sulfide, hydrosulfide, hydride, basic carbonate, or the like in amount sufficient to establish a metal ratio in excess of one, a non-acidic vehicle for the basically-reacting alkaline earth metal compound, e. g., water, a lower alkanol or a lower alkanediol, and the promoter substance; heats the mixture to drive off substantially all the hydroxy vehicle and incidental water of hydration; and stabilizes the resulting product by neutralizing excess alkalinity, usually by blowing with an acid anhydride gas such as carbon dioxide. Excess solids in the mixture can be filtered off prior to or after the neutralizing treatment. The resulting product can be incorporated into mineral lubricating oil, greases, cutting oils and a variety of other oleaginous vehicles. "Metal ratio" as used herein is defined as the ratio of total amount of alkaline earth metal in the mixture to the amount of alkaline earth metal theoretically combinable as a normal salt with the kind of sulfonic acid present.

I have now discovered that improved superbasic hydrocarbyl sulfonates can be made by using, instead of a phenol or a carboxylic acid or a lower molecular weight sulfonic acid or similar promoter substance acidic in nature, a secondary aryl hydrocarbyl amine as the promoter substance. My promoters are characterized by the ability to form salts with strong mineral acids such as hydrochloric. Typical promoters useful in the practice of my invention include phenyl naphthylamines such as phenyl alpha-naphthylamine and phenyl beta-naphthylamine, diphenylamine, ditolylamine, diphenyl paraphenylene N,N'-diamine, the dinaphthylamines, N-methyl aniline, N-stearyl α-, or β-naphthylamine, dinonyl diphenylamine, and N-cyclohexyl aniline. Broadly the secondary aryl amine should have a molecular weight between about 107 and 450. It is unsubstituted by halogens, hydroxyl groups, etc., and, therefore, is described as being hydrocarbyl because it contains only radicals composed of hydrogen and carbon appended to the secondary amino group.

Ordinarily in the practice of my process I use 0.1 to 0.5 gram mol of the secondary aryl amine per equivalent of sulfonic acid (i. e. per mol of monobasic acid, per half mol of normal alkaline earth metal monosulfonate, or per half mol of disulfonic acid, etc.) and, for efficiency and economy in the practice of my process I prefer to use about 0.25 mol of the amine per equivalent of sulfonic acid. Instead of a monoamine one can also use a corresponding secondary diamine or polyamine if desired, e. g., N,N'-diphenyl para phenylene diamine, N,N'-diphenylbenzidine, N,N'-diphenyl ethylene diamine, or indamines. This will reduce the molar proportion of amine somewhat, but not necessarily in direct proportion to the additional number of amino nitrogen atoms available.

My preferred promoter is a phenyl naphthylamine, e. g., phenyl alpha-naphthylamine,

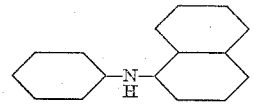

I have also found it advantageous, particularly where economy is an important factor, to use, instead, diphenylamine,

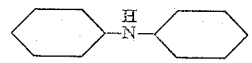

For enhanced hydrocarbon oil solubility one can use also a promoter in which one or more nuclear hydrogen atoms on the aryl group are replaced with an alkyl group, e. g., a $C_1$–$C_{16}$, preferably a $C_6$ to $C_{12}$ alkyl radical such as in the compound dinonyl diphenylamine.

The basically-reacting alkaline earth metal compounds useful in my synthesis are those of barium, strontium, calcium and magnesium. The most effective and also desirable from a standpoint of ease of manufacture is a basically-reacting barium compound, e. g., barium hydroxide, barium hydroxide octahydrate, barium oxide or the like. The basically-reacting alkaline earth compound is dissolved or slurried in one or more non-acidic hydroxy vehicles which can be water, a lower alkanol of 1 to 3 carbon atoms, a lower alkanediol of 1 to 3 carbon atoms, or the like. I have found methanol the superior one of such vehicles for my preparation, and, accordingly, I prefer to use it. Generally about 2 to 20 mols of vehicle are used per equivalent weight of alkaline earth metal in the reaction mixture.

The hydrocarbyl sulfonic acid compound useful in my process can be the oil-soluble hydrocarbyl sulfonic acid itself and/or an alkaline earth metal salt thereof, and is preferably the sulfonic acid for efficiency and economy. In the case where an alkaline earth sulfonate is used as a starting material, it is of course advantageous to use a basically-reacting of the same alkaline earth metal compound in the preparation. Typical oil-soluble hydrocarbyl sulfonic acids for superbasing are the mahogany sulfonic acids, petrolatum sulfonic acids, mono- and polywax substituted benzene sulfonic acids, mono- and polywax substituted naphthalene sulfonic acids, paraffin wax sulfonic acids, polyisobutylene sulfonic acids, petroleum naphthene sulfonic acids, and mono- and poly-wax substituted cyclohexyl sulfonic acids.

The preparation of the superbasic sulfonate of my invention comprises: mixing the oil-soluble hydrocarbyl sulfonic acid (and/or alkaline earth metal salt thereof), sufficient of the basically-reacting alkaline earth metal compound to establish a metal ratio in excess of one and preferably in excess of 2 (generally 3 to 4) in the mixture, the hydroxy vehicle, and the secondary aryl amine promoter; stripping off substantially all said hydroxy vehicle and any incidental water of neutralization; and neutralizing residual alkalinity in the resulting mixture. The stripping can be done at superatmospheric or subatmospheric pressures and with or without a flow of inert stripping gas and/or mechanical agitation, but, for efficiency and economy when using the preferred lighter hydroxy vehicles such as methanol, I prefer to use simple heating at substantially atmospheric pressure for this step. The maximum temperature of such stripping operation can be broadly from 200° to 450° F. for the hydroxy vehicles generally and, with the preferred vehicles, is about 250° to 300° F.; the time of heating at the maximum temperature to remove practically all free hydroxy vehicle and water can be from about ½ to about 8 hours, and is usually 1 to 3 hours.

Neutralization of residual alkalinity is done preferably by blowing with carbon dioxide, e. g., substantially pure carbon dioxide, air containing carbon dioxide, flue gas containing carbon dioxide, or the like. Alternatively or concurrently I can also use other acidic anhydride gases such as $SO_2$, $SO_3$, $HCl$, $NO_2$, $H_2S$, $CS_2$, $COS$, $PCl_3$, $SOCl_2$, $ClO_2$, etc., or dilute mineral acids, e. g., sulfuric, nitric, hydrochloric, or organic acids such as acetic, stearic, caproic, and the like. Advantageously the neutralization is conducted before cooling and filtering the mixture which has been stripped of hydroxy vehicle. Ordinarily it takes ½ to 3 hours to obtain substantial neutrality, i. e., a neutralization number of the reaction mixture from 0 to about 8 (alkaline). Filtration is best done on a hot mixture with the aid of diatomaceous silica or other filtering assistants subsequent to neutralization. It is advisable to neutralize and filter at temperature above about 100° C. to obtain desirably rapid rates of processing and to maintain the product substantially free of water.

A typical lubricating composition made with my novel additives comprises 80 to 99.5 weight percent of mineral lubricating oil and 0.5 to 10 weight percent of my superbasic alkaline earth metal sulfonate. Optionally the lubricating oil can contain small amounts of other additives such as sulfurized sperm oil, a zinc dialkyldithiophosphate, and viscosity index improvers such as sulfurized polyisobutylene, and the like, but need not contain such other additives to be superior to the base mineral oil itself. The superiority of a superbasic sulfonate made according to invention principles over a typical conventional superbasic sulfonate is shown by the results of the MacCoull corrosion tests run on the lubricating oil compositions hereinafter described.

Comparable lubricating oil compositions were made by blending 2.8 weight percent of reference conventional superbasic sulfonate made with nonyl phenol promoter, 0.3 weight percent zinc dialkyl dithiophosphate sold under the trade-name LZ–677 by The Lubrizol Corporation, and 96.9 weight percent of a high grade SAE 30 weight mineral lubricating oil base on the one hand, and 2.8 weight percent of the novel superbasic sulfonate prepared according to invention principles using phenyl alpha naphthylamine promoter, 0.3% by weight of the same zinc dialkyl dithiophosphate (LZ–677) and 96.9% of the same mineral lubricating oil base on the other. (The MacCoull corrosion test measures bearing weight loss under controlled conditions and is described in the magazine "Lubrication," volume 27, page 107, September 1941, published by The Texas Company, New York, N. Y.) The same kind of test bearings of copper-lead were used in each case, and the test temperature was 350° F.

*Average bearing wt. loss, mg.*

| Time | Lubricating Oil with Conventional Superbasic Sulfonate | Lubricating Oil with 2° Aryl Amine Superbasic Sulfonate |
|---|---|---|
| 2 Hours | 0 | 1 |
| 4 Hours | 0 | 0 |
| 6 Hours | 0 | 1 |
| 8 Hours | 3 | 1.5 |
| 10 Hours | 62 | 10 |
| Neut. No. (S) at 10 Hours | 6.4 | 3.0 |

The superbasic alkaline earth metal sulfonates used in each of the above tests was made in the following manner: a slurry of anhydrous barium hydroxide in methanol vehicle was mixed with a blend of a promoter and oil-thinned petroleum sulfonic acids having average mol weight of 450 (oil-free basis), the particular sulfonic acids being sold by L. Sonneborn & Sons, Inc., under the trade-name Petronic Acid. The sulfonic acids had been previously diluted with 0.5 part of a naphthene base oil, having API gravity of 19° to 22° and viscosity of 300 to 324 SSU at 100° F., per part of sulfonic acid. The quantity of promoter used in each case was 0.25 mol per mol of the sulfonic acids, the promoter in the conventional case being nonyl phenol and in the test case phenyl alphanaphthylamine. The proportion of barium hydroxide to sulfonic acid used was 1.875 mols per mol of sulfonic acid, this establishing a metal ratio of 3.75 in the mixture. The mixture was heated up to 150° C. and maintained there for 2½ hours, thereby stripping out practically all the methanol and water of neutralization in the mixture. The vapor space in the reaction vessels was blanketed with nitrogen to assist in stripping. Neutralization in each case was obtained by blowing the mixture with carbon dioxide, and each product was filtered with the assistance of a diatomaceous silica sold under the trade-name of "Super Cel" by the Johns-Manville Sales Corporation. The analytical results for the preparations are given below:

| Analysis | Conventionally Promoted | Promoted with 2° Aryl Amine |
|---|---|---|
| Weight Percent Sulfated Ash | 25.5 | 25.0 |
| Neutralization No | 2 (alkaline) | 0 |
| Metal ratio in product | 3.61 | 2.73 |

Additional superbasic barium sulfonates were made by essentially the same procedure as the one described in the foregoing example, except that diphenyl amine was used as promoter in one instance in the ratio of 0.25 mol per equivalent (mol) of the Petronic Acid, and in the other instance dinonyl diphenyl amine was used as promoter in the ratio of 0.128 mol per equivalent (mol) of the Petronic Acid. The analytical results for these preparations are given below:

| Analysis | Petronic Acid, Diphenyl-amine | Petronic Acid, Dinonyldiphenyl-amine |
|---|---|---|
| Weight Percent Sulfated Ash | 25.1 | 19.3 |
| Neutralization No | 0 | 5 |
| Metal Ratio in Product | 2.70 | 2.06 |

Obviously, many modifications and variations of the invention, as hereinbefore set forth, may be made without departing from the spirit and scope thereof, and

I claim:

1. In a process for preparing superbasic alkaline earth metal sulfonates by heating a mixture containing at least one compound selected from the group consisting of oil-soluble hydrocarbyl sulfonic acids and alkaline earth metal salts thereof, a basically-reacting alkaline earth metal compound, and a promoter substance and neutralizing residual alkalinity in the resulting heated mixture with an acidic anhydride gas, the improvement which comprises using as the specific promoter substance 0.1 to 0.5 gram mol of a secondary aryl hydrocarbyl amine per equivalent of sulfonic acid in said mixture.

2. The process of claim 1 wherein said aryl amine promoter is a phenyl naphthylamine.

3. The process of claim 1 wherein said aryl amine promoter is diphenylamine.

4. The process of claim 1 wherein said aryl amine promoter is a polyalkyl diphenylamine in which the alkyl groups have 1 to 16 carbon atoms.

5. The process of claim 1 wherein said basically-reacting alkaline earth metal compound is a barium compound.

6. In a process for preparing superbasic alkaline earth metal sulfonates by adding a basically-reacting alkaline earth metal compound to a mixture of an oil-soluble hydrocarbyl sulfonic acid and a promoter substance to form a reaction mixture, thereafter heating said reaction mixture to remove incidental water of neutralization, and neutralizing residual alkalinity in the resultant heated mixture with an acidic anhydride gas, the improvement which comprises using as the specific promoter substance from 0.1 to 0.5 gram mol of a secondary aryl hydrocarbyl amine per equivalent of sulfonic acid in said mixture.

7. The process as claimed in claim 6 wherein the basically reacting alkaline earth metal compound is barium hydroxide, the acidic anhydride gas is carbon dioxide, and the secondary aryl hydrocarbyl amine is phenyl alpha-naphthylamine.

References Cited in the file of this patent

UNITED STATES PATENTS

| | | |
|---|---|---|
| 2,692,858 | Evans et al. | Oct. 26, 1954 |
| 2,723,236 | Asseff et al. | Nov. 8, 1955 |
| 2,727,861 | Brown et al. | Dec. 20, 1955 |
| 2,760,970 | Le Suer | Aug. 28, 1956 |